United States Patent [19]

Krueger

[11] Patent Number: 4,877,948

[45] Date of Patent: Oct. 31, 1989

[54] COMBINATION BAR CODE AND MARK-SENSE READER

[76] Inventor: Loren L. Krueger, 4834 Merilee Dr., Minnetonka, Minn. 55343

[21] Appl. No.: 66,163

[22] Filed: Jun. 25, 1987

[51] Int. Cl.$^4$ .............................................. G06K 7/08
[52] U.S. Cl. .................................. 235/449; 235/454; 235/474; 235/456; 235/376
[58] Field of Search ................ 235/449, 376, 454, 476

[56] References Cited

U.S. PATENT DOCUMENTS

| | | |
|---|---|---|
| 3,502,850 | 3/1970 | Lindquist ............................ 235/474 |
| 3,760,161 | 9/1973 | Lohne et al. . | |
| 3,949,363 | 4/1976 | Holm . | |
| 4,013,893 | 3/1977 | Hertig ........................... 235/449 UX |
| 4,298,859 | 11/1981 | Feilchenfeld ....................... 235/456 |
| 4,402,088 | 8/1983 | McWaters et al. . | |
| 4,408,344 | 10/1983 | McWaters et al. . | |
| 4,542,528 | 9/1985 | Sanner et al. . | |

FOREIGN PATENT DOCUMENTS 58-12073 7/1981 Japan .

Primary Examiner—Harold I. Pitts
Attorney, Agent, or Firm—John G. Shudy, Jr.

[57] ABSTRACT

A combination reader capable of reading a document containing both bar coded and manually marked information. The read information is processed, displayed and stored.

8 Claims, 3 Drawing Sheets

Fig. 3

COMBINATION BAR CODE AND MARK-SENSE READER

FIELD OF INVENTION

The present invention pertains to reading systems and particularly to optical readers of coded information. More particularly, the invention pertains to simultaneous reading of both machine printed bar code information and hand-entered mark-sense information from the same document.

RELATED ART

Optical readers are well known in the art. There are optical readers of bar codes, alphanumeric formats, binary code symbols, codes in ink invisible under ordinary light, and mark-sense codes. No art was found disclosing a device capable of reading a combination of hand-entered sense code with machine pre-printed bar code.

SUMMARY OF THE INVENTION

The invention is a combination reader comprising a scanning means for scanning data in the form of bar code and mark-sense code, a decoding means for decoding scanned bar code and mark-sense data, a timing means for timing the scanning means with movement of a document being scanned. The decoded data signals are processed, displayed and stored by a computer. Processed data may be put in printed form.

Mark-sense data are manually entered data that are capable of being machine read.

The present invention has the capability of reading both machine-printed bar codes and human-made mark-sense coding from the same paper form, document or data page. No need of a keyboard is required for such inputs. The feature of complete machine readability of both these kinds of information from the same page eliminates manual secondary operations for translating data from a source page into computer-usable form, as in a keypunch or other keyboard operations for computer entering.

The present invention has advantages over the related art in applications where certain elements of information are predetermined; such as part numbers, prices, operation identifiers, operator identifiers, machine identifiers, and the like; while other information is generated at the point of interest; such as time, date, materials used, good part counts, and the like. Predetermined or known information items are used to prepare pre-printed bar code or other machine readable labels, which are then affixed to the data page. Predefined areas may be used, corresponding to adjacent blank mark-sense fields. As the generated information becomes available, it is entered (i.e., added to the page) by means of marking the mark-sense data fields. The completed data fields then become completely machine-readable data pages requiring no further manual data transcription either for the bar coded or the mark-sense coded information. The present invention can accept the data page and read both the affixed bar code labels and the manually entered mark-sense fields. Together these items comprise a completed transaction ready for input to a computer or other data management system.

One application of this type of reporting may be a maintenance worker's time report. As a maintenance person moves from place to place to perform work, a data page carried by the worker provides the preset agenda of maintenance jobs near the affixed bar coded labels (which also bear man-readable printing). As each job is performed, the worker fills in the time (or other information) using the mark-sense fields. If changes in the agenda occur, an empty space otherwise filled by a bar code label may be used to write in the change until a proper bar code is obtained. By simple extension of this application, factory workers, delivery vehicle drivers, repair workers, even attorneys and consultants may make use of this method of combining machine-prepared coding and manually generated information on a completely machine-readable coded form, without the need of a keyboard or machine for entering information during the performance or after completion of work for an exclusively machine readable form without the necessity of other tools for recordation.

BRIEF DESCRIPTION OF THE DRAWINGS

FIG. 3 is an example of a document with mark-sense data and bar code data which are readable by the invention.

DESCRIPTION OF THE PREFERRED EMBODIMENT

Figure 1:
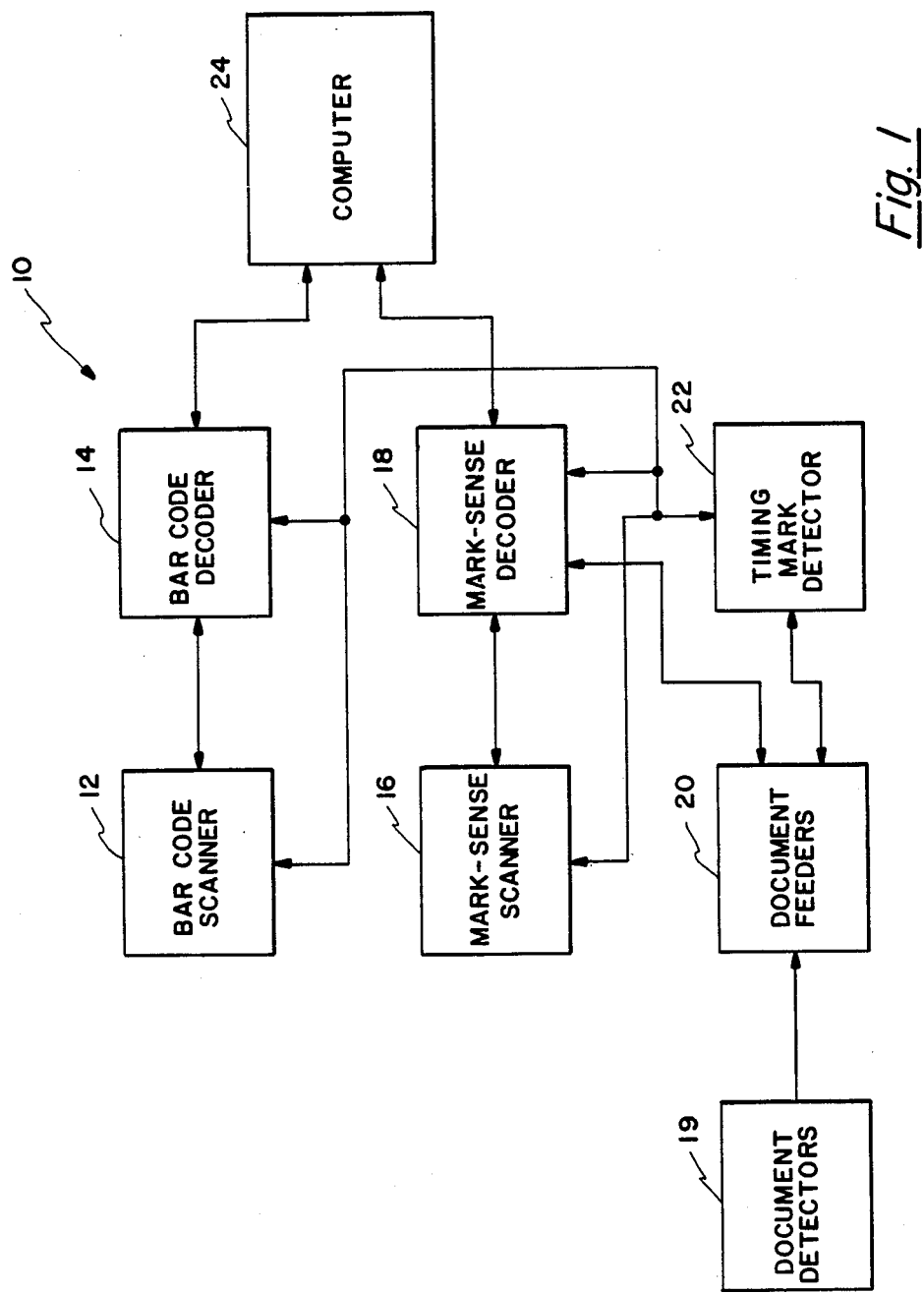
FIG. 1 is a block diagram of the invention.
Figure 3:
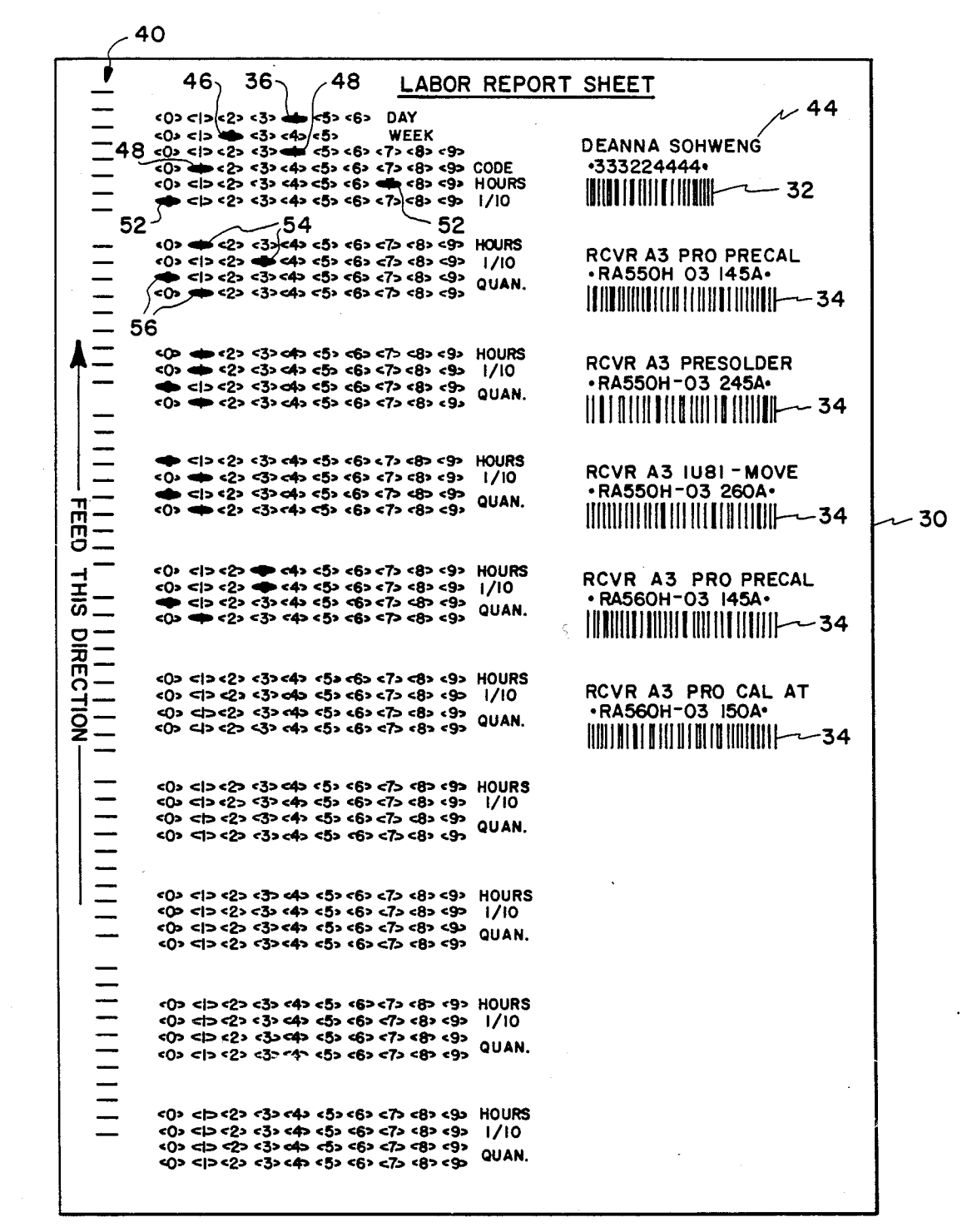

The combination reader 10 of FIG. 1 has a bar code scanner 12 for reading bar codes 32 and 34 from report or form 30 as illustrated in FIG. 3. bar code scanner 12 may be one of various kinds of bar code scanners or readers available on the commercial market. The particular scanner used in this embodiment is a laser scanning head capable of providing high speed data entry from all popular bar codes. Bar code scanner 12 is model number MS131 available from Metrologic Instruments, Inc., of Bellmawr, New Jersey 08031. Scanner 12 may be a different model capable of bar code scanning from another supplier. The hardware for bar code decoder 14 is likewise available from Metrologic Instruments, Inc, or other companies. The alphanumeric information resulting from the decoding by bar code decoder 14 of signals from bar code scanner 12 is fed into an RS-232 port of computer 24. The hardware from Metrologic Instruments, Inc., is designed for interfacing with RS-232 ports. Computer 24 may be a micro, mini or main frame computer. For instance, a Radio Shack or IBM personal computer may be utilized. The data from bar code decoder 14 may be analyzed, displayed, stored and/or printed out by computer 24 and peripheral equipment. The displaying of information may include the printing out of information. Materials and equipment for constructing the invention may be chosen from a variety of items available in the marketplace.

Mark-sense scanner 16 scans human-made marks 36 recorded on a paper form or report 30 as illustrated in FIG. 3. The signals from mark-sense scanner 16 go to mark-sense decoder 18 to be converted into digital signals representing alphanumeric information which is sent to an RS-232 port with computer 24. Mark-sense scanner 16 may be one of various mark-sense scanners available on the commercial market. In the present embodiment, mark-sense scanner 16 and mark-sense decoder 18 incorporate hardware from a Scan-Tron model 5200 optical mark reader available from Scan-Tron Corporation of Rancho Dominguez, California 90220.

Timing mark detector 22 indicates to bar code scanner 12 via bar code decoder 14 and to mark-sense scanner 16 via mark-sense decoder 18 when to begin scanning the information of form or report 30. Timing mark detector 22 receives its timing information from marks 40 along the left margin of form 30. Marks 40 pertain to the various groupings of mark-sense and bar code information on form 30. Timing mark detector 22 is available on the market in various forms and can be incorporated in the system by one ordinarily skilled in the art. The present embodiment incorporates the timing mark detector incorporated in the Scan-Tron model 5200 reader.

Document feeders 20 move report or form 30 without the assistance of manual movement, through the fields of view of bar code scanner 12 and mark-sense scanner 16 at an appropriate speed as deemed by the input to document feeders 2 from mark-sense decoder 18 which indicates whether or not mark-sense scanner 16 is ready to scan the next row of mark-sense data. Bar code scanner 12 is ready to scan the next segment of bar code data when mark-sense scanner 16 is similarly ready to scan the next row of mark-sense data.

Document detectors 19 simply detect the presence of document 30 and signal to the document feeders 20 that document 30 is present and may be moved along, especially in the case where no portion of document 30 is within the fields of view of scanners 12 and 14, as indicated by timing mark indicator 22. If document 30 is within the scanners' (12 and 14) fields of view, then a signal from mark-sense decoder 18 or timing mark detector 22 to document feeders 20 may override the signal from document detectors 19 to document feeders 20. Document detectors 19 may incorporate such of the Scan-Tron model 5200 reader.

All blocks in FIG. 1 represent items easily available from the commercial market, and are connectable by one ordinarily skilled in the art. Each connecting line among the blocks of FIG. 1 represents one or more wires.

Figure 2:
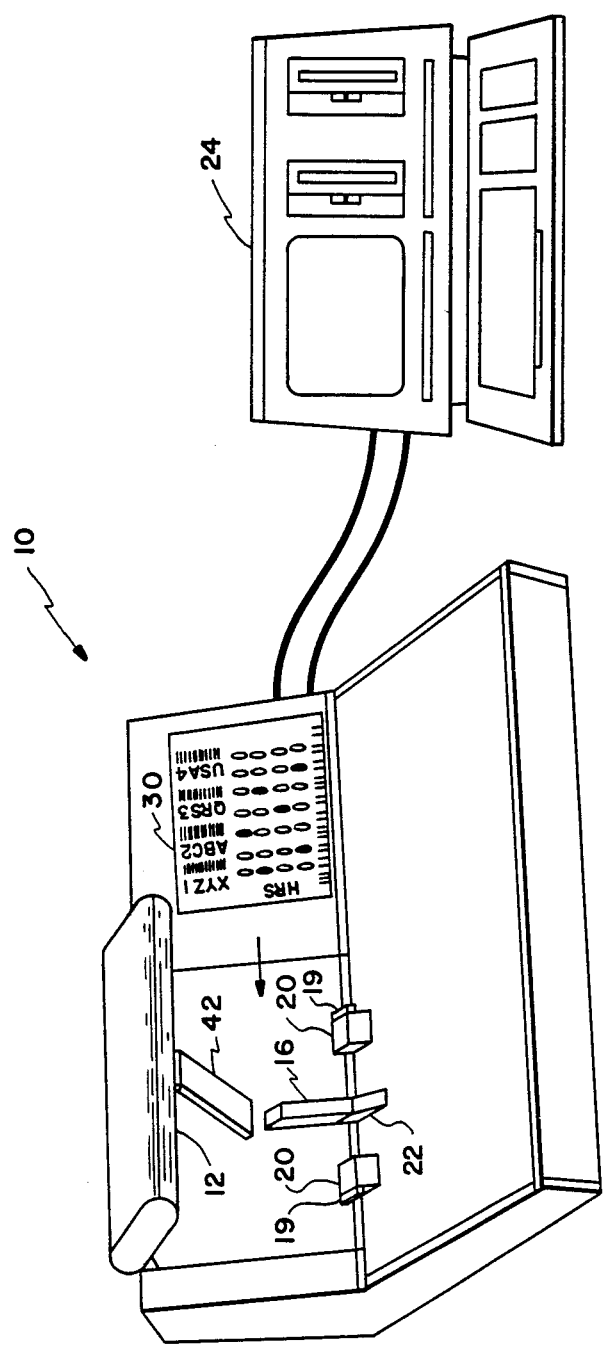
FIG. 2 is an illustration of the actual hardware of the preferred embodiment.

FIG. 2 illustrates preferred embodiment 10 incorporating computer 24. In operation, form 30 is laid on its left margin with the data facing outward and is moved to the left until form 30 touches a detector 19. A signal from detector 19 causes feeder 20 to pull document 30 to the left appropriately so that the mark-sense data and the bar code data may begin to be scanned by mark-sense scanner 16 and bar code scanner 12, respectively. As the data from form 30 is about to be scanned, timing mark detector 22 senses the document and in conjunction with feeder 20 and mark-sense decoder 18, appropriately moves the document 30 for detection of information by scanners 12 and 16. Scanner 12 has a reflective mirror 42 to properly deflect the laser scanning light to document 30 and to return respective reflections to scanner 12. A prism or other appropriate light conveying means may be used in lieu of mirror 42. After the last row of data of form 30 is detected by scanners 12 and 16, left feeder 20 ejects form 30 to the left as long as left document detector 19 senses the presence of document 30. After ejection of read document 30, device 10 becomes ready to accept another form or document 30 for scanning.

FIG. 3 shows an example of a form or document 30 which may be scanned by device 10. Document 30 in conjunction with device 10, is particularly useful and applicable in accounting for labor operations. For example, this labor report sheet 30 is for a worker involved in electronic receiver production. Employee or worker name 44 is Deanna Sohweng. The employee's identification number is 333224444 which is represented by bar code 32. Bar codes 34 and associated printed matter are pre-printed on form 30 before the employee receives labor report sheet 30. The employee, as he or she receives form 30, merely has to make marks with a pencil in the left column to fill out the required information from the start of a job to the finish of it as indicated by the listed bar codes and associated information in the right column. Mark 36 of the left column of mark-sense spaces indicates the fourth day of the week. Mark 46 indicates the second week of the month. Marks 48 indicate the worker's group code. Marks 52 indicate the starting time of employment for the designated day. The first set of rows of mark-sense data provides the basic information relating to labor report sheet 30.

The second through fifth sets of rows of mark-sense spaces pertain to the actual work being performed by employee 44. Corresponding to these rows of marks on spaces directly to the right are bar code data 34 and associated descriptions. The set of rows of information associated with the first set of bar code data 34 pertains to the task of production pre-calibration of receiver model A3. The information is abbreviated in the next line placed between the asterisks—RA refers to the receiver; 03 refers to the model number; 50 refers to the lot number; H refers to the location, i.e., Hopkins, MN; and 145A refers to the operation identification number. This alphanumeric sequence is represented by bar code 34 just beneath the sequence. Directly to the left are mark-sense spaces corresponding to the just-described task. Marks 54 indicate that 1.3 hours were spent on the respective task. Marks 56 indicate the quantity (i.e., one) of receivers worked on in the production pre-calibration task. The remaining sets of rows of mark-sense data spaces and corresponding bar code information are similar to those just described.

With labor report sheet 30, an operator's time spent on preparing production reports is drastically minimized thus permitting the employee to spend a greater percentage of his time performing the assigned work task. The employee merely has to make a few pencil marks for complete task documentation. No computer, no keystrokes, no files, no filling out long forms, and no requirement of being in a specific area or location of a facility are required. The operator may carry form 30 wherever he or she goes. Form 30 may also be used as a shipping label or slip that is moved with the product within or outside of a manufacturing or other facility. Forms 30 are easily read, deciphered and analyzed with device 10 for determinations of efficiency, time, quantities, and other desired information of a production task or other kind of labor.

The above-described preferred embodiment is merely illustrative of the many specific embodiments which represent different applications of the principles of this invention. Numerous various other arrangements can be devised in accordance with the presently described principles, by those skilled in the art without departing from the scope of the present invention.

The following is claimed:

1. A combination reader comprising:
   bar code scanning means for scanning bar coded information on a document;
   mark-sense scanning means for scanning mark-sense data on said document;

bar code decoding means, connected to said bar code scanning means, for decoding signals from said bar code scanning means;

mark-sense decoding means, connected to said mark-sense scanning means, for decoding signals from said mark-sense scanning means; and timing means, for timing said bar code and mark-sense scanning means with movement of said document relative to said scanning means, comprising:

timing mark detecting means, connected to said bar code scanning means, to said mark-sense scanning means, to said bar code decoding means, and to said mark-sense decoding means, for detecting timing marks on said document;

document feeding means, connected to said mark-sense decoding means and to said timing mark detecting means, for moving said document through fields of view of said bar code scanning means and said mark-sense scanning means; and document detecting means, connected to said document feeding means, for detecting the presence of said document.

2. A combination reader comprising:
a bar code scanner;
a mark-sense scanner;
a timing mark detector connected to said bar code scanner and to said mark-sense scanner;
a bar code decoder connected to said bar code scanner and to said timing mark detector;
a mark-sense decoder connected to said mark-sense decoder and to said timing mark detector;
a first document feeder connected to said mark-sense decoder and to said timing mark detector; and
a second document feeder connected to said mark-sense decoder and to said timing mark detector.

3. A combination reader comprising:
scanning means for scanning bar coded and mark-sense coded data;
decoding means, connected to said scanning means, for decoding signals from said scanning means;
processing means, connected to said decoding means, for processing decoded signals from said decoding means, comprising:
    display means for displaying processed decoded signals; and
    storage means, connected to said display means, for storing said processed decoded signals;
at least one documenting means for documenting bar coded data and mark-sense coded data which are scanned by said scanning means, comprising:
    manually marked-sense data in one portion of said documenting means;
    bar coded data in another portion of said documenting means; and
    timing marks; and
timing means, for timing said scanning means, comprising:
    timing mark detecting means, connected to said scanning means and to said decoding means, for detecting said timing marks on said documenting means;
    feeding means, connected to said decoding means and to said timing mark detecting means, for feeding said documenting means through said scanning means; and
    detecting means, connected to said feeding means, for detecting said documenting means.

4. Apparatus of claim 2 further comprising:
a first document detector connected to said first document feeder; and
a second document detector connected to said second document feeder.

5. Apparatus of claim 4 wherein said combination reader is for reading both bar coded data and manually marked data from a document.

6. Apparatus of claim 5 wherein said combination reader is for simultaneously reading both bar coded data and manually marked data from the same document.

7. A combination reader comprising:
a bar code scanner;
a mark-sense scanner;
a bar code decoder connected to said bar code scanner;
a mark-sense decoder connected to said mark-sense scanner;
a timing mark detector connected to said bar code scanner, to said mark-sense scanner, to said bar code decoder, and to said mark-sense decoder;
at least one document feeder connected to said mark-sense decoder and to said timing mark detector;
at least one document detector connected to at least one said document feeder; and
a computer, connected to said bar code decoder and to said mark-sense decoder, having a display and storage means.

8. Apparatus of claim 7 comprising at least one document, having both bar coded data and manually marked-sense data, to be scanned by said combination reader.

* * * * *